Nov. 3, 1936.  C. JACKSON  2,059,239
IMPLEMENT FOR TREATING AND PLACING MATERIALS
Filed Sept. 26, 1934   2 Sheets-Sheet 1
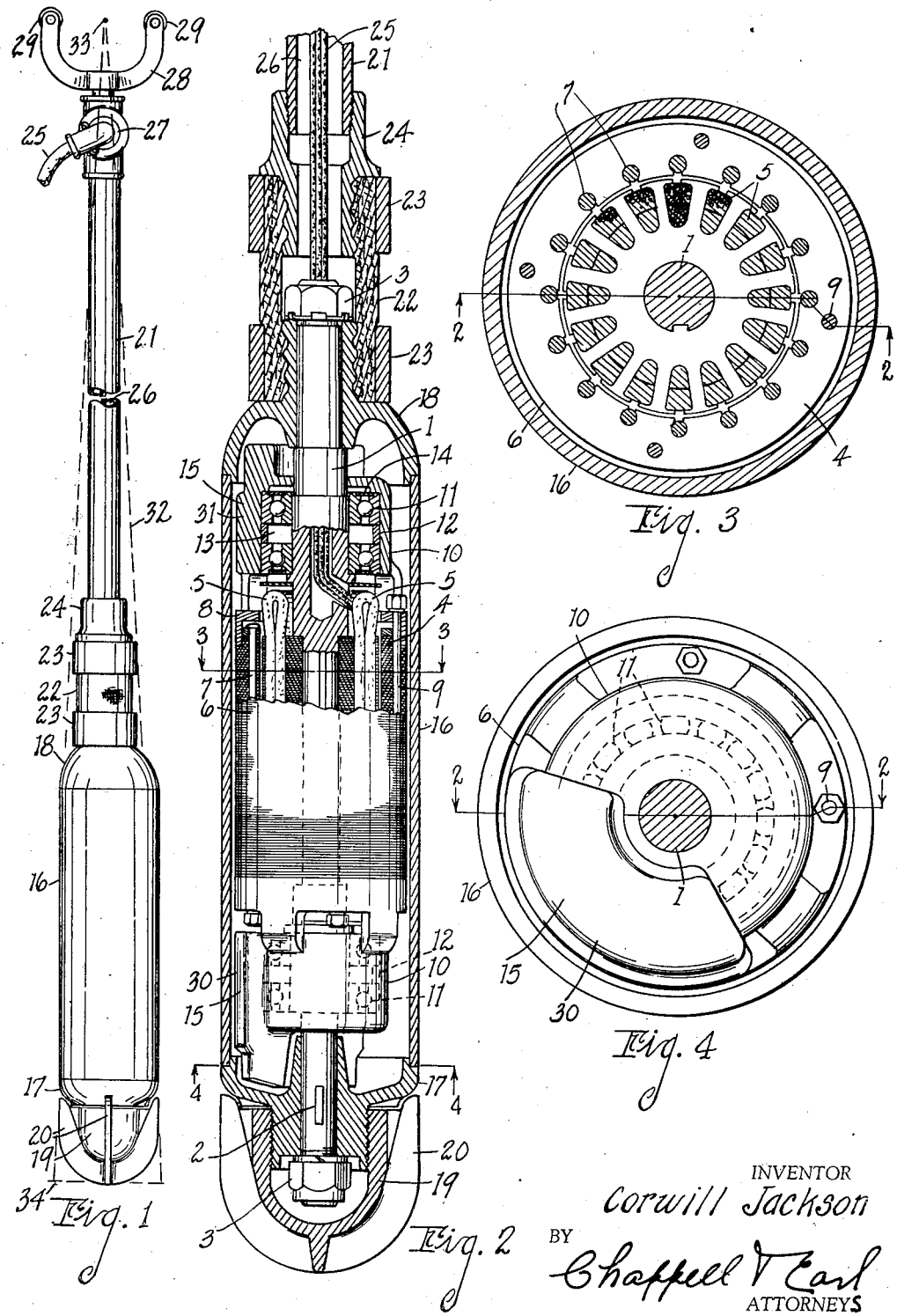
INVENTOR
Corwill Jackson
BY
Chappell & Earl
ATTORNEYS

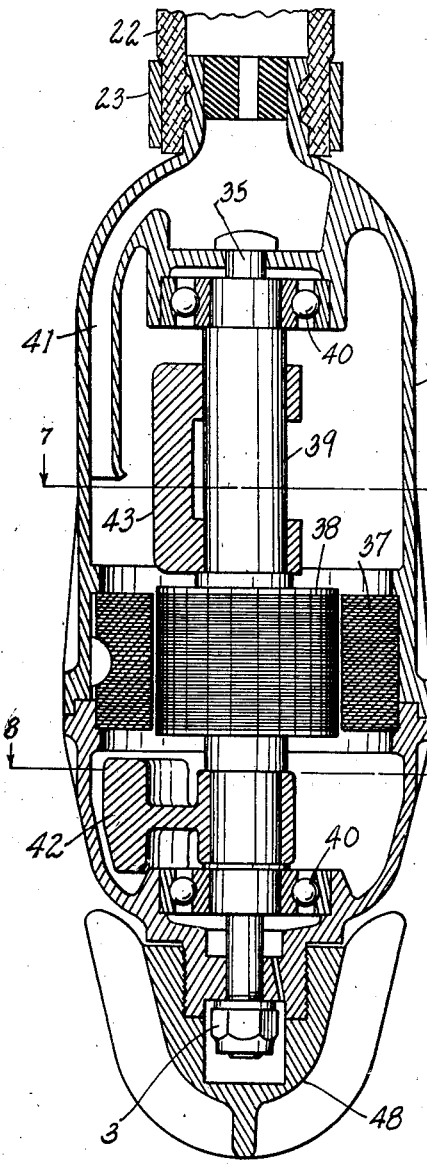
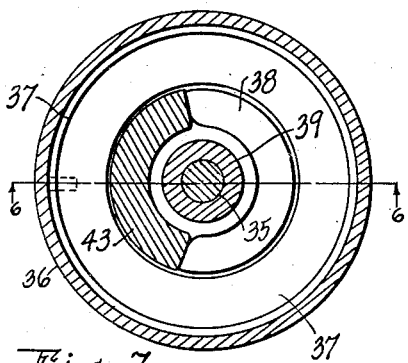
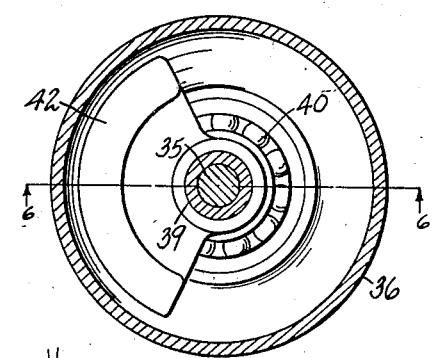
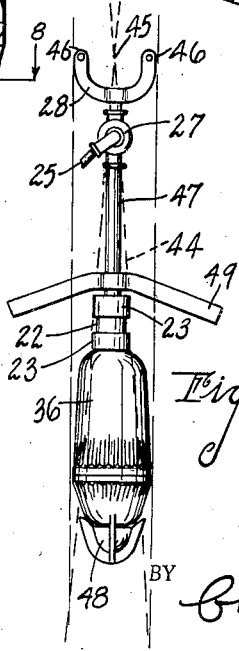

Patented Nov. 3, 1936

2,059,239

UNITED STATES PATENT OFFICE 2,059,239

IMPLEMENT FOR TREATING AND PLACING MATERIALS

Corwill Jackson, Ludington, Mich.

Application September 26, 1934, Serial No. 745,562

18 Claims. (Cl. 259—72)

The main objects of this invention are:

First, to provide an improved implement which is especially well adapted to be submerged and manipulated in concrete and other materials for effectively vibrating them.

Second, to provide an implement of this character of relatively small diameter to increase the range of usefulness thereof in relatively restricted spaces such as forms.

Third, to provide an apparatus of this character which is of large capacity.

Fourth, to provide a manually operable implement of this character in which vibrations are substantially entirely eliminated in the grip or handle.

Objects relating to details and economies of my invention will appear from the description to follow. The invention is defined and pointed out in the claims.

Structures which are preferred embodiments of my invention are illustrated in the accompanying drawings, in which:

Fig. 1 is a fragmentary view in side elevation of an implement for placing concrete and other materials embodying the features of my invention.

Fig. 2 is an enlarged fragmentary longitudinal section of the implement taken on a line corresponding to line 2—2 of Figs. 3 and 4.

Fig. 3 is an enlarged transverse section taken on a line corresponding to line 3—3 of Fig. 2.

Fig. 4 is an enlarged transverse section taken on a line corresponding to line 4—4 of Fig. 2.

Fig. 5 is a fragmentary view in side elevation of a modification of my invention.

Fig. 6 is an enlarged fragmentary longitudinal section of the modification taken on a line corresponding to line 6—6 of Figs. 7 and 8.

Fig. 7 is a transverse section taken on line 7—7 of Fig. 6.

Fig. 8 is a transverse section taken on line 8—8 of Fig. 6.

In implements designed to be submerged in newly poured or placed concrete, for example, it is highly desirable in some cases that the diameter of the implement be as small as possible so that the device can be used in connection with relatively narrow forms. Further, it is also desirable in some cases that the implement be long to penetrate to a substantial depth and vibrate the concrete effectively throughout its mass. I have reduced the size of the implement to as low as four inches in diameter without materially changing the horse power or efficiency of the motor.

In squirrel cage induction motors of conventional design, it is customary to wind the field coils on forms, after which the coils are inserted in slots in the stator laminations and secured in place by strips of hardwood or fiber constituting supporting wedges. The rotor of a conventional squirrel cage induction motor consists of a laminated core having spaced holes around its periphery through which are driven copper conductor bars, the ends of which are welded to short-circuiting rings, thus forming the so-called squirrel cage rotor.

I depart from such conventional design by using a stationary shaft on which the stator laminations are mounted, the latter being provided with suitable slots for receiving the windings. The rotor or squirrel cage revolves around the stator. Unbalancing weights are cast integral with two end caps which are secured to the rotor and also serve as bushing brackets for the ball bearings which are in turn supported upon the non-revolving shaft. An outer housing consisting of a section of tubing and two end castings is clamped into position by means of a threaded section on each extremity of the shaft and clamping nut.

The construction is shown in the drawings by Figs. 1 to 4, inclusive, in which 1 is the stationary or non-revolving shaft which is prevented from rotating by the Woodruff key 2 and end clamping nuts 3. On this shaft, medially of the ends, I mount the laminated stator 4 having windings or coils 5. The rotor or revolving squirrel cage 6 is provided with conductor bars 7 and short-circuiting rings 8 therefor.

By means of through bolts 9, I secure the end caps 10 to the rotor assembly, the caps being recessed to carry the pairs of ball bearings 11 which are separated by a spacer washer 12, thus forming a compartment 13 into which is packed a suitable lubricant for lubricating the bearings over a long period of time. I prefer to use so-called "oil seal" bearings having a washer 14 at each end acting to prevent leakage of the lubricant. The proper lubrication of tools of this class is very important, and I have found in practice that this construction provides sufficient lubricating material for at least six months' operation.

I conform the end caps 10 so as to provide unbalancing sectors or weights 15 which act to vibrate the implement when the rotor turns—in this case about 3600 R. P. M. The outer casing 16 is preferably formed of steel tubing, the end members or caps 17 and 18 being securely clamped thereto by the shaft 1 and end nuts 3.

The lower end flange member or cap 17 is provided with an outer cap or head 19 for protecting the retaining nut 3, the cap being provided with fins 20 for resisting the tendency of the implement to rotate in operation. The upper cap 18 is held in place by the upper clamping nut 3 and constitutes a support for the non-revolving shaft 1. A tubular handle 21 is flexibly connected to the upper cap 18 through a heavy section of hose 22 clamped securely by clamps 23 to both the upper cap 18 and the adapter 24. The conductors 25 from the stationary field windings 5 pass through the hollow portion 26 of the shaft and through the handle to any suitable connector plug or switch (not shown), the supply preferably being 3-phase, 60-cycle alternating current. The handle outlet for the conductors 25 is indicated at 27.

With this construction for an implement having a diameter of only four inches, the normal rating of the motor is .75 horse power having an efficiency of approximately 80% which is indeed high for an implement of this small diameter. The disposition of the rotor outside of the stator in connection with my arrangement of the unbalancing weight also results in a very high flywheel effect which is very desirable in implements of this character.

In prior machines of this general type, the unbalancing weight or weights were arranged so that the implement vibrated in a direction substantially at right angles to its axis. Such vibration resulted in quickly injuring the arms and hands of the operator unless suitable cushioning means were provided, and one of the primary objects of my invention is to obviate this undesirable feature in machines of this type, and the necessity of careful cushioning. To this end, I arrange the mass and radius of the unbalancing weights with respect to the handle so that the implement vibrates in a substantially cone-shaped path with the handle grip at the apex and the outer end of the implement at the base thereof.

This is illustrated in Fig. 1 of the drawings, in which 28 is a yoke at the outer end of the tubular handle 21, the yoke being provided with grips 29. The mass and radius of the lower weight 30 is purposely made greater than the mass and weight of the upper weight 31 so that the implement vibrates in a cone-shaped path 32, the center of which is at 33 between the grips 29, and the base 34 of which is at the bottom of the outer cap 19. Thus, the amplitude of vibration is greatest where most effective and least where undesired. Thus, the operator is relieved of the vibrations of the implement and further, the efficiency of the machine is increased inasmuch as all of the vibrations are transmitted directly to the material in which the operating part of the implement is submerged.

Referring to Figs. 5 to 8, inclusive, of the drawings, I illustrate my improvements in connection with an implement having a conventional electric motor and being necessarily of large diameter compared to my implement according to the foregoing description. In the modification, the implement comprises a central stationary shaft 35 which constitutes a bolt for holding the sections 36 of the casing together. The laminated stator 37 is clamped between the casing sections and drives the laminated rotor 38 which is carried by the armature sleeve 39, the latter being rotatable on the stationary shaft 35 and supported in the bearings 40 by the casing sections. The conductors (not shown) leading to the stator 37 pass through the passage 41 formed in one side of the upper casing section.

The lower unbalancing weight 42 has a mass and radius greater than the upper unbalancing weight 43 so that when the armature 39 to which they are secured is rotated by the operation of the motor, the implement vibrates in a substantially conical path 44, the apex 45 of which is between the grips 46 of the handle 47 and the base of which is at the lower end cap 48 as described above in connection with the implement illustrated by Figs. 1 to 4, inclusive. The auxiliary handling member or bar 49 is used in inserting and withdrawing the implement in the plastic mass, but is adapted to be used only occasionally, the grips 46 being used most of the time to manipulate the device.

By arranging the unbalancing weights in the foregoing manner, I not only eliminate excessive vibration at the grip, but also make it easier for the operator to control the tool and manipulate it without injuring his arms and hands. In my preferred implement, the diameter is such that the tool can be inserted in relatively small forms and, owing to its relatively great length compared to its diameter, effectively vibrates the plastic concrete throughout its mass. It is thus seen that I provide an implement which is very effective and efficient for the purpose intended.

While the implement or apparatus of this application is especially desirable for use in the placing of mixtures of concrete having such low water content as to commonly be regarded as unworkable or in accordance with the method disclosed in my Patent No. 1,787,449, issued January 6, 1931, the implement is of value in placing or treating other materials by subjecting to vibrations.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Although I have shown and described certain specific embodiments of my invention, I am fully aware that many modifications thereof are possible. My invention, therefore, is not to be restricted except insofar as is necessitated by the prior art and by the spirit of the appended claims.

Having thus described my invention, what I claim as new and desire to secure by Letters Patent, is:

1. An implement of the class described comprising a tubular casing containing a motor having a rotor provided with axially spaced unbalancing weights, and a tubular handle resiliently connected to said casing in axial alinement with said rotor and terminating in a transverse grip, the mass and radius of said weights uniformly decreasing toward said grip so that the implement vibrates in a cone-shaped path with said grip at approximately the apex and the tubular casing at the base thereof.

2. An implement of the class described comprising a tubular casing adapted to be submerged in the material being treated containing a motor having a rotor provided with axially spaced unbalancing weights, and a tubular handle connected to said casing in axial alinement with said rotor and having a transverse grip, said weights being arranged so that the implement vibrates in a cone-shaped path with said grip at approximately the apex.

3. The combination with a tubular casing having a central stationary shaft, and a handle in line with said shaft and terminating in spaced transverse grips, of an electric induction motor stator fixed to said shaft, a squirrel cage rotor adapted to rotate between said stator and casing, bearing brackets at the ends of said rotor having unbalancing weights, and bearings between said shaft and brackets, the lower weight having a weight and mass coacting with that of the upper weight to vibrate the implement in a conical path having its apex between said grips and its base at the lower end of the casing so that the grips are substantially free of the vibratory action resulting from the rapid rotation of said rotor.

4. The combination with a tubular casing having a central stationary shaft, and a handle in line with said shaft and having spaced transverse grips, of an electric motor stator fixed to said shaft, a rotor adapted to rotate between said stator and casing, bearing brackets at the ends of said rotor having unbalancing weights, and bearings between said shaft and brackets, the lower weight having a weight and mass coacting with that of the upper weight to vibrate the implement in a conical path having its apex between said grips.

5. The combination with a casing comprising a pair of end members, and a central bolt holding said members together, of an electric motor rotor rotatable on said bolt, a stator for said rotor clamped between the casing members, spaced eccentric weights on said rotor, a handle on one end of said casing in line with said rotor, and spaced transverse grips on said handle, said weights being of different mass acting to vibrate the implement in a conical path having its apex between said grips when said rotor is rotating.

6. The combination with a casing comprising a pair of end members, and a central bolt holding said members together, of an electric motor rotor rotatable on said bolt, a stator for said rotor clamped between the casing members, spaced eccentric weights on said rotor at the ends of the rotor winding, a handle on one end of said casing in line with said rotor, and spaced transverse grips on said handle.

7. In a vibro-implement, the combination with a casing comprising a pair of end members, and a central bolt securing said members together, of an armature rotatable on said bolt, bearings arranged between said end members and the ends of said armature, spaced weights on said armature, means including an electric motor having its stator mounted within the casing and its rotor mounted on the armature for rotating said weights, and a handle on said casing having a grip, said weights decreasing in mass and radius as they approach said grip for vibrating the casing end of the implement in a wide amplitude and the grip end thereof in a narrow amplitude.

8. In a vibro-implement, the combination with a casing comprising a pair of end members, and a central bolt securing said members together, of an armature rotatable on said bolt, bearings arranged between said end members and the ends of said armature, spaced weights on said armature, means for rotating said weights, and a handle on said casing having a grip, said weights decreasing in mass and radius as they approach said grip for vibrating the casing end of the implement in a wide amplitude and the grip end thereof in a narrow amplitude.

9. In a vibro-implement, the combination with a casing comprising a pair of end members, and a central bolt securing said members together, of an armature rotatable on said bolt, bearings arranged between said end members and the ends of said armature, weights mounted at the ends of said armature for rotation therewith, and a handle on said casing having a grip, said weights vibrating the casing end of the implement in a wide amplitude and the grip end thereof in a narrow amplitude.

10. An apparatus of the class described comprising a closed cylindrical motor housing, a shaft fixed at its ends to the ends of said housing, said shaft having a longitudinal bore at its upper end, a motor stator fixed to said shaft intermediate its ends, a rotor embracing said stator and having bearings on said shaft at the ends of said stator, said rotor being provided with unbalancing weights in the transverse plane of the bearings, a tubular handle connected to the upper end of the housing and constituting an electric circuit conduit, the bore of said shaft constituting an extension for said conduit and having an opening below the upper bearing.

11. An apparatus for subjecting materials to vibrations comprising a closed housing adapted to be submerged in the material being treated and having ends provided with shaft supports, a shaft mounted on said supports, a stator mounted on said shaft intermediate the ends thereof, a rotor surrounding said stator and having bearings at its ends disposed between said shaft support and the ends of the stator, said rotor having unbalancing weights at the ends thereof, and a handle connected to the upper end of the housing.

12. An apparatus for treating concrete and like materials comprising a closed cylindrical motor housing adapted to be submerged in the material being treated, a shaft mounted at its ends on said housing, a motor stator mounted on said shaft intermediate its ends, a rotor embracing said stator and having bearings on said shaft at the ends of said stator, said rotor being provided with an unbalancing weight at one end thereof, and a handle at the upper end of the housing.

13. An apparatus for subjecting materials to vibrations comprising a closed housing adapted to be submerged in the material being treated, a shaft mounted at its end on said housing, a stator mounted on said shaft intermediate the ends thereof, a rotor surrounding said stator and having bearings at the ends of said stator, said rotor having unbalancing weights at the ends thereof, the unbalancing weight at the lower end of the stator being of greater magnitude than that at the upper end, and a handle at the upper end of the housing.

14. An apparatus for subjecting materials to vibrations comprising a closed housing adapted to be submerged in the material being treated, a shaft mounted at its end on said housing, a stator mounted on said shaft intermediate the ends thereof, a rotor surrounding said stator and having bearings at the ends of said stator, said rotor having an unbalancing weight at one end thereof, and a handle at the upper end of the housing.

15. An apparatus of the class described comprising a closed motor housing, a shaft mounted at its ends to the ends of the housing, said shaft having a longitudinal bore at its upper end, a motor stator mounted on said shaft intermediate its ends, a rotor embracing said stator and having bearings on said shaft at the ends of said stator, said rotor being provided with an unbalancing weight, a tubular handle having a resilient tubular connection to the upper end of the housing and constituting an electric circuit conduit, the bore of said shaft constituting an extension for said conduit and having an opening below the upper bearing.

16. An apparatus for subjecting materials to vibrations comprising a closed housing adapted to be submerged in the material being treated and having ends provided with shaft supports, a shaft mounted on said supports, a stator mounted on said shaft intermediate the ends thereof, a rotor surrounding said stator and having bearings at its ends disposed between said shaft support and the ends of the stator, said rotor having an unbalancing weight at one end thereof, and a handle connected to the upper end of the housing.

17. An apparatus for subjecting materials to vibration comprising a closed elongated tubular housing adapted to be inserted into the material to be treated and having its ends provided with shaft supports, a shaft provided with bearings adjacent the ends of the housing, a rotor supported by said bearings and having unbalancing weights in the planes of the bearings, and a handle at one end of the casing disposed axially of said rotor and having a grip, the proportions of the weights being such that the implement vibrates in a conical shaped path with the grip at approximately the apex thereof.

18. An apparatus for subjecting materials to vibration comprising a closed housing adapted to be inserted into the material being treated, a motor disposed within said housing and having a rotor provided with axially spaced unbalancing weights, and a handle connected to one end of the casing and provided with a grip, said weights being of such relative proportions and arrangement that the implement vibrates in a conical path with the grip at approximately the apex thereof.

CORWILL JACKSON.